Nov. 12, 1940.  D. B. DIMICK  2,221,044
MANUALLY OPERATED HYDRAULIC LOCK
Filed April 7, 1939  2 Sheets-Sheet 1
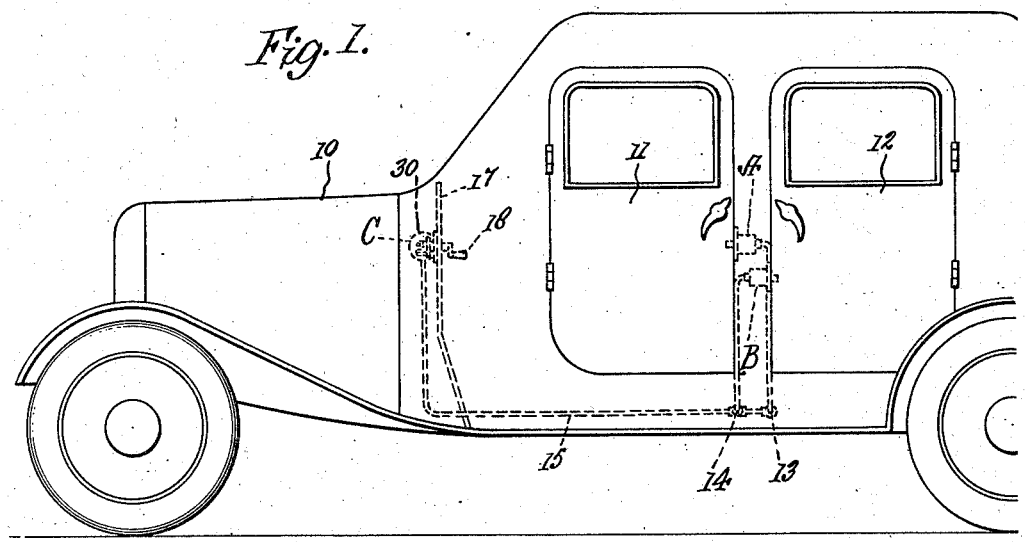
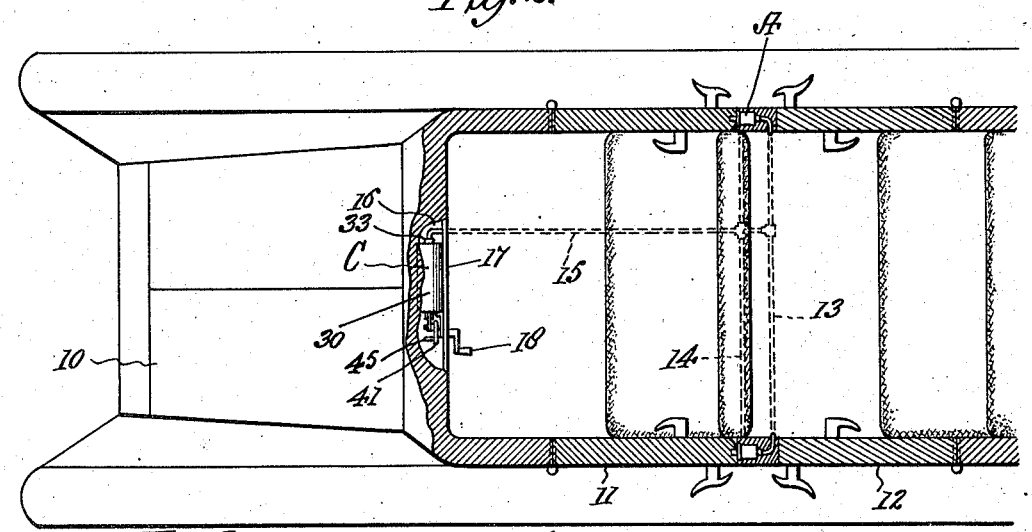
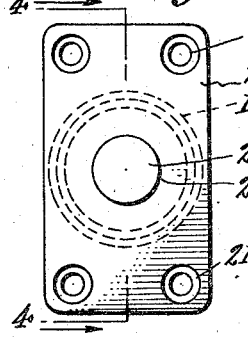
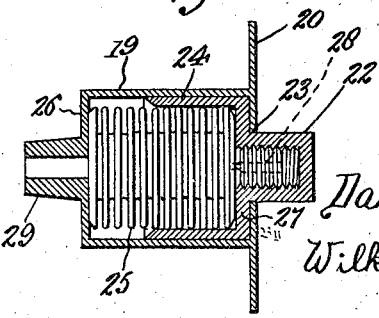
Inventor
Daniel B. Dimick
Wilkinson & Mawhinney
Attorneys.

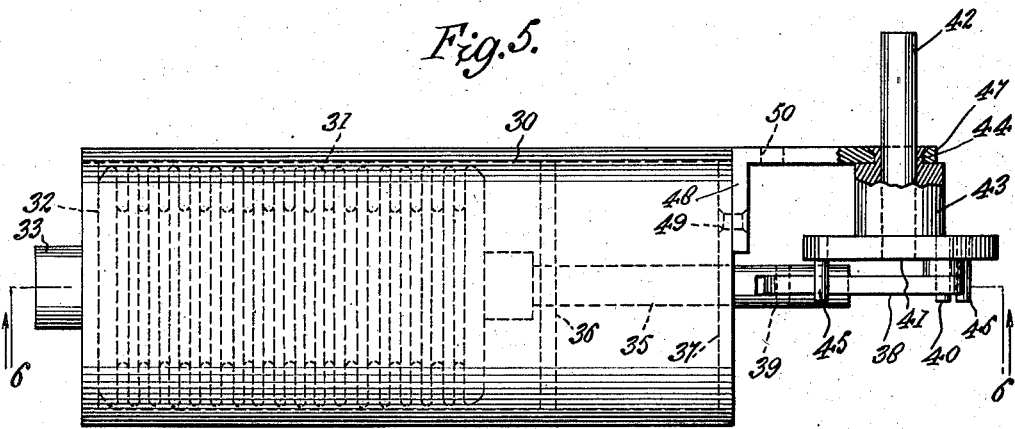
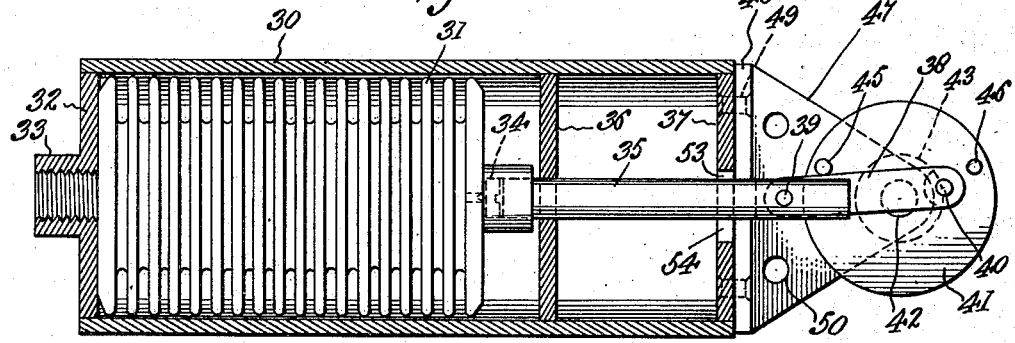
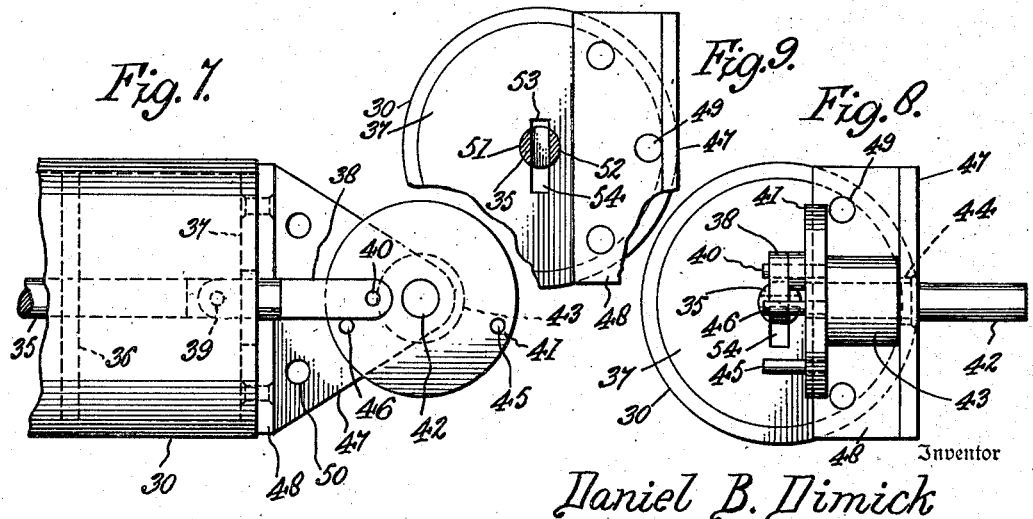

Patented Nov. 12, 1940

2,221,044

UNITED STATES PATENT OFFICE 2,221,044

MANUALLY OPERATED HYDRAULIC LOCK

Daniel B. Dimick, Newton, Mass., assignor to Dimick-Mosher Products Company, Boston, Mass., a corporation of Massachusetts Application April 7, 1939, Serial No. 266,664

6 Claims. (Cl. 292—33)

The present invention relates to improvements in manually operated hydraulic locks, and more particularly refers to such a lock applied to modern automobile doors.

It is an object of the invention to provide for an arrangement of locks for the doors of automobiles all operated and controlled from a central or master station, located, for instance, within easy reach of the driver's compartment of the automobile whereby the driver or chauffeur by a simple manipulation may cause all of the locks on all the doors of the automobile to be thrown into the locked position; the device further contemplating the use of hydraulic, mechanical connections which will insure the maintenance of the locks in the projected locked condition without regard to vibration and jars to which a vehicle is subjected incident to its ordinary travel over the roadway, thereby preventing the casual or accidental opening of doors, and preventing also the deliberate or inadvertent unlocking and opening of the doors by children riding particularly in the back seats of vehicles where their actions cannot be supervised or repressed by the driver of the vehicle.

The invention therefore has for an additional object of providing a safety arrangement in connection with the locks of vehicle doors whereby children and others will be virtually imprisoned until such time as the car is safely stopped at a destination, whereupon the driver may manipulate his master or control device to cause a positive retraction of all the locking bolts of the doors.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a fragmentary side elevation of an automobile equipped with a system of hydraulic lock control constructed in accordance with the present invention.

Figure 2 is a top plan view of the same with parts broken away and parts shown in section and with the locking bolts projected.

Figure 3 is a front elevation of the face plate of one of the locking units and also showing the locking bolt.

Figure 4 is a vertical section taken on the line 4—4 in Figure 3.

Figure 5 is an enlarged plan view, with parts broken away and parts shown in section, of the master or control device.

Figure 6 is a longitudinal vertical section taken on the line 6—6 in Figure 5.

Figure 7 is a fragmentary front elevation of the master device with the parts shown in the opposite position from Figure 6.

Figure 8 is an end elevation of the master or control device, and

Figure 9 is a plan view of the master cylinder end head showing the plunger rod in section.

Referring more particularly to the drawings, 10 designates generally an automobile having front doors 11 and rear doors 12. The front doors have lock units A and the rear doors 12 have rear door lock units B. Both the locking units A and B are hydraulic and may be of the construction shown more particularly in Figures 3 and 4 to which specific reference will hereinafter be had.

These locking units are connected by branch pipes 13 and 14 with a transmission pipe 15 leading to the master or control device indicated generally at C, which device is shown more particularly in Figures 5 to 9 inclusive, to which more specific reference will hereinafter be had. The master or control device C is preferably located in a compartment 16 just forward of the instrument board 17 through which projects a handle, a hand crank or any other operating member 18 disposed in a position accessible to the driver's seat or the chauffeur's compartment of the vehicle.

Referring more particularly to Figures 3 and 4, 19 designates a cylindrical housing, preferably made of brass, the length of which may be $1\frac{1}{16}''$, the inside diameter being for example $1\frac{1}{8}''$, and the outside diameter being preferably $1\frac{1}{16}''$. This cylinder carries a face plate 20, preferably an integral part of the cylinder. The face plate 20 is preferably rectangular in shape, as shown in Figure 3, and is provided with a number of screw holes 21 countersunk for receiving screws or other fastenings whereby the lock casing or cylinder is secured to the door frame of the vehicle. The lock bolt is shown at 22 which is adapted to project out through a central opening 23 in the face plate 20 and into the usual socket or striker plate in the edge of the door. This lock bolt 22 is carried by a follower sleeve 24 slidably mounted in the cylinder 19 and having its rear end open to receive the bellows 25, which bellows bears at one end against the end head 26 of the cylinder 19 and at its other end against the flange 27 connecting sleeve 24 and bolt 22. In the projected position of the bolt shown in Figure 4 the flange 27 abuts against face plate 20, which latter forms a stop for the bolt 22. The bellows 25 and sleeve 24 will be secured together so that when the bellows 25 collapses it will draw the bolt 22 with it whereby to unlock the door. The travel of the follower 24 axially in the cylinder 23 may be about $\frac{3}{8}''$.

The diameter of the bellows may be $\frac{7}{16}''$ and the length about $1''$, having a maximum extension and retraction equivalent to ⅜". Such a bellows is known as a "Hydron," metallic bellows, is commercially available and is composed of inherently resilient, corrugated metal which is readily contractible and expansible.

A bleeder valve 28 is carried by one end of the bellows 25 and may be mounted within the protection of the hollow bolt 22. A nipple or other connection 29 is connected internally to the bellows 25 at the head end 26.

Preferably a non-freezing fluid, such as a suitable oil or gelatin, is forced into the bellows, causing the bellows to expand. When the oil is drawn off the bellows retracts. In doing so it carries the bolt 22 and the follower sleeve 24 with it. The nipple 29 connects with one of the branch pipes 13 or 14.

Referring more particularly to Figures 5 to 9 inclusive, the master unit is therein shown operating upon substantially the same principle as the lock unit heretofore described. Within the cylindrical housing 30 is a bellows 31 of the same character as above described or of other appropriate character, being preferably approximately 1⅞" in diameter with a capacity to operate four locks. The bellows 31 may be slid into cylinder 30 through the left hand end before the head 32 is put in place, such head being preferably afterward welded or otherwise permanently secured. The pipe connection 15 may connect with the bellows 31 by an internally threaded or other nipple 33 on the head 32. The bleeder valve of the bellows 31 is indicated at 34. At the inner end of the bellows, that is at the end remote from head 32, is a plunger rod 35 connected with this end of the bellows and having a sliding bearing through a septum or partition wall 36 mounted within the cylinder 30 inwardly remote from the end head 37 which may be made in one piece with the cylinder or may be made separately and afterwards welded or permanently united with the cylinder 30 when the head 37 is put in place. The plunger rod 35 projects out beyond the end head 37 and has a slotted outer free end into which is received one end of a pitman or link 38, a pivot 39 coupling this end of the link 38 to the rod 35. The other or outer end of link 38 is secured by a pivot pin 40 eccentrically upon a driving disc 41. This disc is fixedly mounted upon an operating shaft 42 which projects through a spacing and bearing sleeve 43 having a reduced end 44 which is upset in an opening in a bracket 47. Any suitable means may be utilized to hold the master control device to the inside face of the instrument board 17 or in a position within the pocket 16. The shaft 42 projects through the instrument board 17 and fixedly receives thereon the crank or operating member 18, which as heretofore stated, lies within the compartment of the driver of the vehicle and within easy access to his hand.

The driving disc 41 carries stop pins 45 and 46 which project laterally from that face of the disc which is adjacent to link 38 and rod 35 whereby during rotary motion of the disc one pin and then the other will impinge against link 38, and act to restrain and arrest the further rotary movement of the disc 41.

The pins 45 and 46 are preferably located relatively upon the face of the disc 41 as shown in Figure 6 in which they are disposed approximately upon the same arc and a little over 90° apart; this being for the purpose of allowing a substantially 180° turn of the disc. For this motion compare the two positions of the disc shown in Figures 6 and 7 and the relative positions of the pins 45 and 46. The pins allow substantially a half rotary motion of the disc and react with the link 38 to hold the rod 35 and the entrained bellows 31 in a dead center locking position shown in Figures 6 and 7, which however is easily broken by reason of the fact that the rotary force is applied through the shaft 42 at the center of the disc 41. In Figure 6 the pivots 39 and 40 are shown in a substantially dead center position; that is these pivots are substantially in line with the center of the disc or rotary member 41 so that the bellows 31 can neither open nor close; in fact it is locked in the fully expanded position with the locking bolt retracted. In Figure 7 the pivot pins 39 and 40 are also shown in substantial alinement with the center of the disc or rotary member 41; in other words the link is in another dead center position diametrically opposite the position shown in Figure 6, so that in the position of the parts shown in Figure 7, the bellows 31 will be in its completely collapsed position with the locking bolt projected. The pins 45 and 46 abut opposite sides of the link 38 in these two dead center positions to limit the movement of the disc and link, to notify the operator when the dead center locking positions have been arrived at, and to tend to hold the parts in the dead center positions until force is applied at the center of the disc to rotate the parts out of such dead center locking position. The bracket 47 has a flange 48 attached by rivets or other appropriate fastenings 49 to the end head 37. This bracket 47 may also have holes 50 for receiving fastenings by which the device is secured to the instrument board 17.

The axis of the cross shaft 42 and the axis of the master unit bellows 31 are at right angles. Whenever throwing the latch out or in, the device is positioned in such a manner as to be dead centered which gives it a positive, locked position.

In operation, when the system is connected up, and closed, with the bleeder valves open at each individual lock, the system is filled with non-freezing fluid, such as "Three-In-One" oil or gelatinous substances until the bleeder valves bleed. Then the bleeder valves are closed and the whole system is hermetically sealed with no possible means of leakage. Therefore, when the operation takes place of locking the car doors by throwing the latch or handle 18, for instance, downward all four bolts at the individual locks are forced outward and held in this locked position against pressure. When the handle 18 is turned back the same positive action occurs.

Of course the handle or crank 18 could be so arranged as to turn through an angle of only 90° to effect the locking and unlocking of the bolts or the link 38 could have any throw desired. When the master bellows 31 is contracted, as when the disc 41 is rotated to the position shown in Figure 7, the fluid will be forced out into the pipe line 15, 13, 14 and to the various control units causing the bellows 25 therein to expand and project the bolts 22. When the disc 41 is rotated to the position shown in Figure 6, the master bellows 31 will be expanded and the lock bellows 25 will be thereby contracted withdrawing the bolts 22 from the striker plates.

It will be appreciated from the foregoing that the improved device provides a manually operated hydraulic lock operated by the driver of the automobile, and placed in a position to be operated only by him.

The device can be so arranged that the two rear doors of automobiles may be locked independently from any other lock system provided by the manufacturer; or three or four locks may be provided, as the case may require, all operated by the turning of one handle by the operator of the car.

Referring to Figures 6 and 9, it will be understood that the end head 37 is formed with partially round opposed walls 51 and 52 to receive, guide and support the guide rod 35 when that rod is made of the round cross section shown in the drawings. Above and below these partially round walls 51 and 52 are extension spaces 53 and 54 for the purpose of enlarging the opening through which the guide rod 35 passes in order to accommodate and receive the link 38 when for instance in the position shown in Figure 7, and when moving out of this position; it being understood that from the position shown in Figure 7, the disc 41 must rotate counter-clockwise to enable the disc to arrive at the position shown in Figure 6.

It is obvious that various changes and modifications may be made in the details of construction and design of the above specifically described embodiment of this invention without departing from the spirit thereof, such changes and modifications being restricted only by the scope of the following claims:

What is claimed is:

1. In a manually operated hydraulic lock, a lock unit comprising a face plate, a cylinder casing secured to the rear wall of said face plate, said face plate forming an end plate for the cylindrical casing, a hollow sleeve mounted to reciprocate in said casing and having the end thereof remote from the face plate open, said sleeve having a flange at the other end adapted to abut against said face plate, a hollow lock bolt carried by said sleeve and slidable through said face plate, a bellows in said casing and projecting into said sleeve and fastened to said sleeve, a bleeder valve for the bellows housed within said hollow bolt, a master unit situated remotely from said lock unit and comprising a bellows, and means to expand and contract said bellows, and hydraulic fluid connections between the bellows of said master unit and the bellows of the lock unit.

2. In a locking device of the character described for automobile doors and the like in which a movable bolt locks and unlocks the door, hydraulic means associated with said bolt for both projecting and retracting said bolt, a master hydraulic unit situated in the driver's compartment of the automobile and comprising hydraulic means coupled to the first named hydraulic means, and actuating means for the hydraulic means comprising a rotary disc, a link pivoted at one end to said disc and at the other end to a part of said hydraulic means, a handle connected to the disc for rotating the disc in opposite directions, and pins on the disc for encountering said link on predetermined angular movement of said disc in opposite directions.

3. In a locking device of the character described for automobile doors and the like in which a movable bolt locks and unlocks the door, hydraulic means associated with said bolt for both projecting and retracting said bolt, a master hydraulic unit situated in the driver's compartment of the automobile and comprising hydraulic means coupled to the first named hydraulic means, and actuating means for the hydraulic means comprising a rotary disc, a link pivoted at one end to said disc and at the other end to a part of said hydraulic means, a handle connected to the disc for rotating the disc in opposite directions, and pins projecting from said disc in the path of said link, said pins being separated on the disc at a little over 90° angular distance whereby to encounter the link on substantially the ends of a 180° movement of said disc in opposite directions and to arrest the movement of the disc when the link is in substantially dead-centered positions at opposite ends of its half-rotational movements.

4. In a device of the character described, lock units each comprising movable lock bolts for the doors of automobiles, and hydraulic devices connected to said bolts for both projecting and retracting the same, a master unit in the driver's compartment of the automobile comprising a casing, a movable hydraulic device in said casing, fluid connections between said master unit hydraulic device and the hydraulic devices of all of the lock units, a guide rod connected to said master unit hydraulic device, a partition in said casing having a bearing for slidably receiving said guide rod, an actuating disc, a bracket on said casing for supporting said disc with its axis at substantially right angles to the path of movement of said rod, a link pivoted to said disc and to said rod, pins projecting from said disc in the path of said link and spaced at slightly over 90° apart angularly on the disc, an actuating shaft coupled to said disc and extending through said bracket, a bearing and spacing sleeve receiving said shaft and spacing the disc from said bracket, and an actuating handle on said shaft projecting into the driver's compartment of the automobile.

5. In a device for locking automobile doors and the like, a movable locking bolt for the door, a local hydraulic element for retracting and projecting said locking bolt, a master hydraulic element positioned conveniently in a central position on the automobile, a connection between said hydraulic elements, and an actuating device for the master hydraulic element including a rotary member, means for manually rotating said member in opposite directions, a link pivoted to said rotary member and to the master hydraulic element, and stop means on said rotary member positioned to contact said link on movement of the rotary member in opposite directions through an angular distance of substantially 180°.

6. In a device for locking automobile doors and the like, local movable locking bolts for the doors, local hydraulic elements for projecting and retracting said locking bolts, a master hydraulic element in a central position upon the vehicle, connections between said master hydraulic element and said local hydraulic elements, and actuating means for the master hydraulic element comprising a rotary member, means for applying rotational force at substantially the center of said rotary member to rotate the same in relatively opposite directions, a link pivoted eccentrically upon said rotary member and also pivoted to a part of said master hydraulic element, and angularly displaced pins on said rotary member projecting into the path of said link and positioned relatively to the link to contact opposite sides of said link when the rotary member is rotated through alternate angular distances of approximately 180°.

DANIEL B. DIMICK.